J. STUART.
STEEL CAR WHEEL.
APPLICATION FILED JULY 7, 1914.
1,218,489.
Patented Mar. 6, 1917.
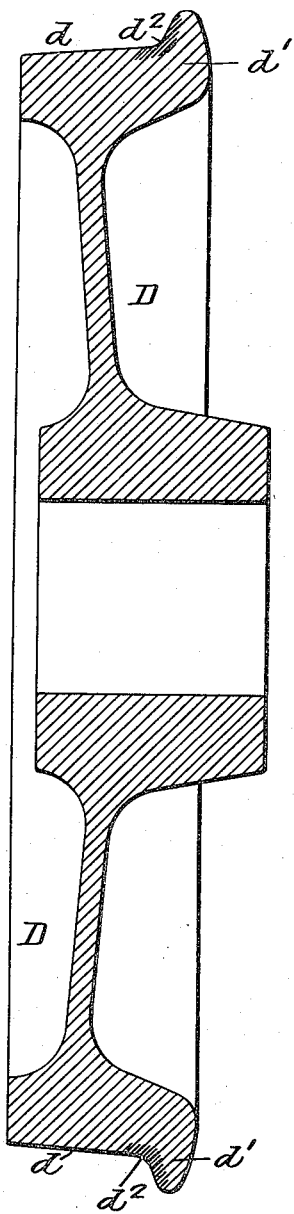

UNITED STATES PATENT OFFICE.

JOSEPH STUART, OF WILMINGTON, DELAWARE, ASSIGNOR TO LOBDELL CAR WHEEL COMPANY, OF WILMINGTON, DELAWARE, A CORPORATION OF DELAWARE.

STEEL CAR-WHEEL.

1,218,489.　　　　　Specification of Letters Patent.　　　Patented Mar. 6, 1917.

Application filed July 7, 1914. Serial No. 849,385.

*To all whom it may concern:*

Be it known that I, JOSEPH STUART, a citizen of the United States, and a resident of Wilmington, county of New Castle, State of Delaware, have invented certain Improvements in Steel Car-Wheels, of which the following is a specification.

The object of my invention is to improve a flanged cast steel wheel having a chilled tread surface by having the flange adjacent the tread hardened, as fully described hereinafter.

In the accompanying drawing the figure is a sectional view of a car wheel illustrating my invention.

D is a cast steel car wheel having a tread surface $d$ and a flange $d'$. The portion $d^2$ of the flange, which adjoins the tread surface, is subjected to the greater wear due to the side movement of the wheel against the rail.

In carrying out my invention, I form an annular recess in the upper portion of the chilled member of the mold which forms the portion $d^2$ of the flange of the wheel and in this recess I place a composition which, in the present instance, contains sand, powdered manganese, or other hardening agent, mixed with molasses. I bake the same in said chill so that the hardening material will form a continuation of the surface of the chill. When the chill and the flasks are assembled and when the molten metal is poured into the mold, it rises and flows over the hardening composition and takes up the hardening material which is incorporated in the casting and hardens the face $d^2$ of the flange $d'$ of the wheel. The chill section of the mold chills the tread of the wheel in the ordinary manner.

By the above method I am enabled to provide an unusually hard surface on that portion of the flange receiving the greatest wear.

I claim:

1. A cast steel car wheel having a tread and flange of integral steel, the tread having a continuous chilled surface, and the flange adjacent the tread being harder than the tread.

2. A steel car wheel having a tread and flange of integral steel, the flange having a continuous chilled surface, and a portion of the flange adjacent to the tread and a portion of the tread at the corner formed by the flange and tread being harder than the chilled surface of the tread.

In testimony whereof, I have signed my name to this specification, in the presence of two subscribing witnesses.

JOSEPH STUART.

Witnesses:
　　JOHN BAIL PEIRCE,
　　FLORENCE L. BLACK.